United States Patent
Besehanic

(10) Patent No.: US 12,010,380 B2
(45) Date of Patent: *Jun. 11, 2024

(54) METHODS AND APPARATUS TO MEASURE EXPOSURE TO STREAMING MEDIA

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,406

(22) Filed: Aug. 29, 2022

(65) Prior Publication Data

US 2022/0408151 A1 Dec. 22, 2022

Related U.S. Application Data

(63) Continuation of application No. 16/428,315, filed on May 31, 2019, now Pat. No. 11,432,041, which is a
(Continued)

(51) Int. Cl.
| | |
|---|---|
| *H04N 21/44* | (2011.01) |
| *G06V 20/40* | (2022.01) |
| *H04H 60/31* | (2008.01) |
| *H04H 60/59* | (2008.01) |
| *H04N 21/4223* | (2011.01) |

(Continued)

(52) U.S. Cl.
CPC ....... *H04N 21/44213* (2013.01); *G06V 20/46* (2022.01); *H04H 60/31* (2013.01); *H04H 60/59* (2013.01); *H04N 21/4223* (2013.01); *H04N 21/435* (2013.01); *H04N 21/4532* (2013.01); *G06V 2201/02* (2022.01); *H04H 2201/50* (2013.01); *H04N 21/8358* (2013.01)

(58) Field of Classification Search
None
See application file for complete search history.

(56) References Cited

U.S. PATENT DOCUMENTS

| | | |
|---|---|---|
| 7,827,312 B2 | 11/2010 | Ramaswamy et al. |
| 8,675,988 B2 | 3/2014 | Chen et al. |

(Continued)

FOREIGN PATENT DOCUMENTS

WO 2012177874 12/2012

OTHER PUBLICATIONS

United States Patent and Trademark Office, "Non-Final Action", issued in connection with U.S. Appl. No. 14/465,510, dated Aug. 27, 2015, 8 pages.

(Continued)

*Primary Examiner* — Cai Y Chen

(57) ABSTRACT

Methods, apparatus, systems and articles of manufacture to measure exposure to streaming media are disclosed. An example apparatus to measure media exposure, the apparatus including memory, computer readable instructions, and processor circuitry to execute the computer readable instructions to obtain an image of streaming media presented by a media device, the media device separate from the processor circuitry, extract a video watermark from a chroma key of the obtained image, convert the video watermark into text formatted metadata, and transmit the text formatted metadate to a central facility.

20 Claims, 11 Drawing Sheets

Related U.S. Application Data continuation of application No. 15/973,080, filed on May 7, 2018, now Pat. No. 10,659,841, which is a continuation of application No. 14/465,510, filed on Aug. 21, 2014, now Pat. No. 9,986,288.

(51) Int. Cl.
*H04N 21/435* (2011.01)
*H04N 21/442* (2011.01)
*H04N 21/45* (2011.01)
*H04N 21/8358* (2011.01)

(56) References Cited

U.S. PATENT DOCUMENTS

| | | | |
|---|---|---|---|
| 9,197,421 | B2 | 11/2015 | Besehanic |
| 9,209,978 | B2 | 12/2015 | Beshanic |
| 9,210,208 | B2 | 12/2015 | Ramaswamy et al. |
| 9,313,544 | B2 | 4/2016 | Besehanic |
| 9,357,261 | B2 | 5/2016 | Besehanic |
| 9,380,356 | B2 | 6/2016 | McMillan et al. |
| 9,515,904 | B2 | 12/2016 | Besehanic et al. |
| 9,609,034 | B2 | 3/2017 | Ramaswamy et al. |
| 9,681,204 | B2 | 6/2017 | McMillan et al. |
| 9,762,965 | B2 | 9/2017 | Besehanic |
| 9,986,288 | B2 | 5/2018 | Besehanic |
| 10,659,841 | B2 | 5/2020 | Besehanic |
| 11,432,041 | B2 | 8/2022 | Besehanic |
| 2011/0022633 | A1 | 1/2011 | Bernosky et al. |
| 2011/0321086 | A1 | 12/2011 | Buchheit et al. |
| 2012/0007797 | A1 | 1/2012 | Huang |
| 2012/0265735 | A1 | 10/2012 | McMillan et al. |
| 2013/0007298 | A1 | 1/2013 | Ramaswamy et al. |
| 2013/0007794 | A1* | 1/2013 | Besehanic .......... H04L 43/06 725/20 |
| 2013/0268623 | A1 | 10/2013 | Besehanic et al. |
| 2013/0268630 | A1 | 10/2013 | Besehanic et al. |
| 2013/0290508 | A1 | 10/2013 | Besehanic et al. |
| 2013/0291001 | A1 | 10/2013 | Besehanic et al. |
| 2013/0311776 | A1 | 11/2013 | Besehanic |
| 2013/0311780 | A1 | 11/2013 | Besehanic |
| 2014/0082220 | A1 | 3/2014 | Ramaswamy et al. |
| 2014/0201767 | A1 | 7/2014 | Seiden et al. |
| 2014/0229629 | A1 | 8/2014 | Besehanic |
| 2014/0229970 | A1 | 8/2014 | Besehanic |
| 2014/0244828 | A1 | 8/2014 | Besehanic |
| 2014/0245335 | A1 | 8/2014 | Holden et al. |
| 2014/0250450 | A1* | 9/2014 | Yu .............. H04N 21/4331 725/19 |
| 2015/0256899 | A1 | 9/2015 | Chand et al. |
| 2016/0043916 | A1 | 2/2016 | Ramaswamy et al. |
| 2016/0301988 | A1 | 10/2016 | McMillan et al. |
| 2016/0353171 | A1 | 12/2016 | Besehanic |
| 2017/0041204 | A1 | 2/2017 | Besehanic et al. |
| 2017/0195716 | A1 | 7/2017 | Ramaswamy et al. |
| 2017/0293943 | A1 | 10/2017 | Harrison |
| 2018/0255351 | A1 | 9/2018 | Besehanic |

OTHER PUBLICATIONS

United States Patent and Trademark Office, "Final Action", issued in connection with U.S. Appl. No. 14/465,510, dated Jan. 22, 2016, 8 pages.

United States Patent and Trademark Office, "Notice of Allowance and Fee(s) Due", issued in connection with U.S. Appl. No. 14/465,510, dated Jan. 29, 2018, 8 pages.

International Seraching Authority, "Search Report," issued in connection with International Patent Application No. PCT/US2014/068420, dated Apr. 28, 2015, 3 pages.

International Seraching Authority, "Written Opinion of the International Searching Authority," issued in connection with International Patent Application No. PCT/US2014/068420, dated Apr. 28, 2015, 6 pages.

United States Patent and Trademark Office, "Non-Final Office Action," issued in connection with U.S. Appl. No. 15/973,080, dated Mar. 7, 2019, 9 pages.

United States Patent and Trademark Office, "Notice of Allowance," issued in connection with U.S. Appl. No. 15/973,080, dated Jan. 28, 2020, 7 pages.

United States Patent and Trademark Office, "Notice of Allowance," issued in connection with U.S. Appl. No. 15/973,080, dated Sep. 30, 2019, 7 pages.

United States Patent and Trademark Office, "Final Office Action," issued in connection with U.S. Appl. No. 15/973,080, dated Jul. 31, 2019, 5 pages.

International Bureau, "International Preliminary Report on Patentability," issued in connection with International application No. PCT/US2014/068420, mailed on Mar. 2, 2017, 8 pages.

United States Patent and Trademark Office, "Advisory Action," issued in connection with U.S. Appl. No. 16/428,315, dated Oct. 27, 2021, 3 pages.

United States Patent and Trademark Office, "Advisory Action," issued in connection with U.S. Appl. No. 16/428,315, dated Feb. 25, 2021, 3 pages.

United States Patent and Trademark Office, "Non-Final Rejection," issued in connection with U.S. Appl. No. 16/428,315, dated Dec. 3, 2021, 5 pages.

United States Patent and Trademark Office, "Non-Final Rejection," issued in connection with U.S. Appl. No. 16/428,315, dated Mar. 30, 2021, 7 pages.

United States Patent and Trademark Office, "Non-Final Rejection," issued in connection with U.S. Appl. No. 16/428,315, dated Jul. 2, 2020, 7 pages.

United States Patent and Trademark Office, "Notice of Allowance and Fee(s) Due," issued in connection with U.S. Appl. No. 16/428,315, dated Apr. 22, 2022, 7 pages.

United States Patent and Trademark Office, "Final Rejection," issued in connection with U.S. Appl. No. 16/428,315, dated Aug. 11, 2021, 8 pages.

United States Patent and Trademark Office, "Final Rejection," issued in connection with U.S. Appl. No. 16/428,315, dated Dec. 15, 2020, 8 pages.

* cited by examiner

METHODS AND APPARATUS TO MEASURE EXPOSURE TO STREAMING MEDIA

CROSS-REFERENCE TO RELATED APPLICATIONS

This patent arises from a continuation of U.S. patent application Ser. No. 16/428,315, filed May 31, 2019, now U.S. Pat. No. 11,432,041, which is a continuation of U.S. patent application Ser. No. 15/973,080, filed May 7, 2018, now U.S. Pat. No. 10,659,841, which is a continuation of U.S. patent application Ser. No. 14/465,510, now U.S. Pat. No. 9,986,288, filed on Aug. 21, 2014, and entitled "METHODS AND APPARATUS TO MEASURE EXPOSURE TO STREAMING MEDIA." Priority to U.S. patent application Ser. No. 16/428,315, U.S. patent application Ser. No. 15/973,080, and U.S. application Ser. No. 14/465,510 is hereby claimed. U.S. patent application Ser. No. 16/428,315, U.S. patent application Ser. No. 15/973,080, and U.S. application Ser. No. 14/465,510 are hereby incorporated herein by reference in their entireties.

FIELD OF THE DISCLOSURE

This disclosure relates generally to measuring media exposure, and, more particularly, to methods and apparatus to measure exposure to streaming media.

BACKGROUND

Internet access to media has become widespread. Media is now frequently streamed to consumers via streaming services such as, Netflix™ Hulu™, YouTube, and others. Streaming enables media to be delivered to and presented by a wide variety of media devices, such as a digital versatile disc (DVD) player, a smart TV, an Apple TV®, a Roku™ media player, a Boxee™ media player, a Sony PlayStation™, a Microsoft® Xbox®, an Apple iPad®, a personal computer, etc. A significant portion of media (e.g., content and/or advertisements) is presented via streaming to such devices.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
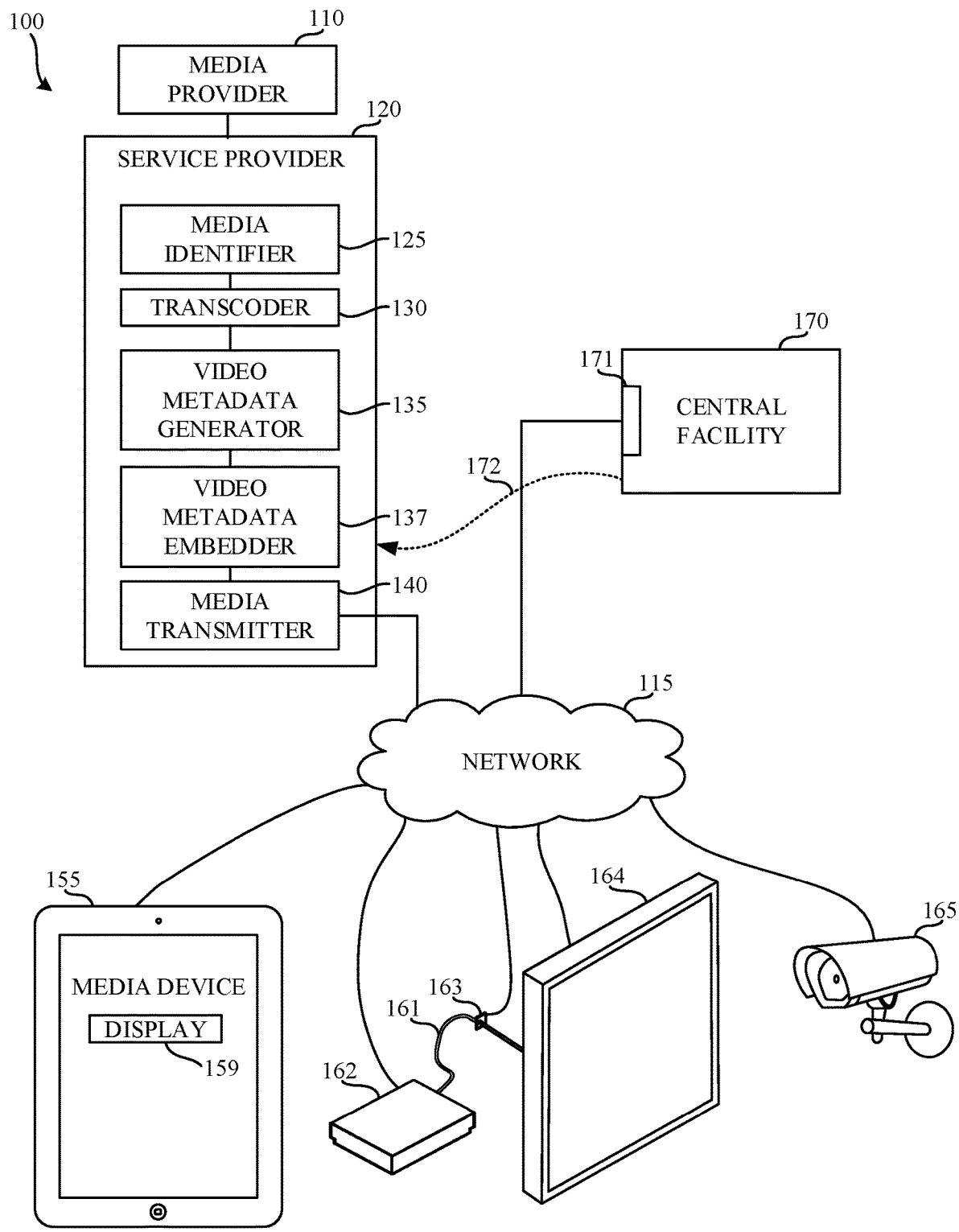
FIG. 1 is a block diagram of an example system constructed in accordance with the teachings of this disclosure for measuring exposure to media.

Example methods, apparatus, systems, and articles of manufacture disclosed herein may be used to measure exposure to streaming media. Some such example methods, apparatus, and/or articles of manufacture measure such exposure based on media metadata, user demographics, and/or media device types. Some examples disclosed herein may be used to monitor streaming media transmissions received at streaming media devices such as a DVD player, a Smart TV, an Apple TV®, a Roku™ media player, a Boxee™ media player, a Sony PlayStation™, a Microsoft® Xbox®, an Apple iPad®, and/or any other device capable of playing media. As used herein, streaming and/or streaming media refers to media that is presented to a user by a media device at least partially in parallel with the media being transmitted (e.g., via a network) to the media device (or a device associated with the media device) from a media provider. Example monitoring processes disclosed herein collect media metadata from watermarks (e.g., video watermarks) associated with (e.g., embedded in) the media and associate the metadata with demographic information of users of the media devices. Advantageously, detection of video watermarks associated with the media enables monitoring of media in situations where traditional audio monitoring techniques are not permitted or ineffective. In this manner, detailed exposure metrics are generated based on collected media identifying metadata and collected user demographics associated with persons identified as exposed to the media.

The use of media devices (e.g., a DVD player, an Apple TV®, a Roku™ media player, a Boxee™ media player, a Sony PlayStation™, a Microsoft® Xbox®, an Apple iPad®, etc.) to present streaming media available via the Internet has increased in recent years. As different types of media applications (e.g., a Netflix™ application, a Hulu™ application, a Pandora™ application, etc.) for such media devices have been created, the popularity of streaming media has increased. Indeed, some households have eliminated traditional sources of media (e.g., satellite television, cable television) in favor of such streaming devices. In view of the increasing popularity of accessing media in this manner, understanding how users interact with the streaming media (e.g., such as by understanding what media is presented, how the media is presented, who is accessing such media, etc.) provides valuable information to service providers, advertisers, content providers, manufacturers, and/or other entities.

Watermarking is a technique used to identify media such as television broadcasts, radio broadcasts, advertisements (television and/or radio), downloaded media, streaming media, prepackaged media, etc. Existing watermarking techniques identify media by embedding codes (e.g., a watermark), such as media identifying information and/or an identifier that may be mapped to media identifying information, into an audio and/or video component. Typically the audio and/or video component has a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header in digital media). As used herein "media" refers to audio and/or visual (still or moving) content and/or advertisements. To identify watermarked media, the watermark(s) are extracted and compared to reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature is preferably repeatable when processing the same media presentation, and is preferably unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier (e.g., a name, title, version number, episode number, etc.) of the media, a presentation time, a broadcast channel, etc., are collected for the reference signature, these attributes may then be associated with the monitored media whose monitored signature matched the reference signature.

Traditionally, media presented by a media device was monitored by detecting the presence of audio watermarks. Audio watermarks are detected within the audio after the audio is received by a microphone. Other ways of receiving audio, such as extracting audio data from an audio buffer, may additionally or alternatively be used. However, detection of audio watermarks can sometimes be difficult to implement. For example, in a noisy environment (e.g., a bar, a sports stadium, a household with children, a household with barking dogs, etc.) it may be difficult to accurately detect the audio watermark. Further, in some other examples, programmatic access to an audio buffer may be restricted. For example, Apple iOS devices (e.g., an iPad™, an iPhone™, an iPod™, etc.) do not allow applications (e.g., an audio watermark monitoring application) to gain access to an audio buffer of another application (e.g., a media application such as, for example, Netflix™, Hulu™, etc.). As such, there are inherent difficulties associated with audio watermark detection.

In examples disclosed herein, video watermarks are used to overcome the difficulties associated with audio watermark detection. Video watermarks are resilient to acoustic noise that may be present in public locations (e.g., a bar, a sports stadium, a noisy household, etc.). Moreover, image(s) can be processed to determine whether the image(s) contain a video watermark. The images may originate from, for example, a screen shot of a display of a media device, a camera of a media device, a camera of a media monitoring device (e.g., a device separate from the device presenting the media), etc.

As disclosed herein, a media device includes device(s) that is/are capable of receiving streaming media and/or causing the streaming media to be displayed. Because the media is displayed by and/or on behalf of the media device, the media device can acquire an image of the displayed streaming media. In some examples disclosed herein, a media monitoring device separate from the media device monitors the media device to identify media presented by the media device. Advantageously, when the media monitoring device is separate from the media device, the media device need not be modified to enable monitoring.

To provide streaming media, media is received at a service provider from a media provider such as, for example, a satellite provider, a cable provider, etc. The media is intended to be streamed from the service provider to one or more media devices for presentation thereon in response to a request for the same.

In some disclosed examples, streaming media is delivered to the media device using HTTP Live Streaming (HLS). However, any other past, present, and/or future protocol(s) and/or method(s) of streaming media to the media device may additionally or alternatively be used such as, for example, an HTTP Secure (HTTPS) protocol, a custom application, etc. In some disclosed examples, a media device uses an application to display media received via HLS. Additionally or alternatively, in some disclosed examples the media device uses a media presenter (e.g., a browser plugin, an app, a framework, an application programming interface (API), etc.) to display media received via HLS.

In the illustrated example, the media is provided to the media devices via a transport stream. In some such examples, the transport stream corresponds to a Moving Picture Experts Group (MPEG) 2 transport stream sent according to an HLS protocol. However, the transport stream may additionally or alternatively correspond to and/or be sent according to any other past, present, or future protocol and/or format such as, for example, MPEG 4, an HTTPS protocol, a file transfer protocol (FTP), a secure file transfer protocol (SFTP). In some examples, metering data having a first format is extracted from the transport stream at the media presentation site (e.g., a monitored panelist location). The extracted metering data is transmitted to an audience measurement entity (AME) for collection and analysis.

To link demographics to the monitoring information, the audience measurement entity establishes a panel of users who have agreed to provide their demographic information and to have their streaming media activities monitored. When an individual joins the panel, they provide detailed information concerning their identity and demographics (e.g., gender, race, income, home location, occupation, etc.) to the audience measurement entity. In some examples, the audience measurement entity sends (e.g., via postal mail and/or courier) a media monitor to be configured intermediate a media device and a display (e.g., a television). In particular, the media monitor provided to each panelist reports exposure to media in substantially real time to a central facility of the audience measurement entity. In some examples, the media monitor reports exposure to streamed media as the exposure occurs (e.g., streaming). In some examples, the media monitor caches (e.g., stores, buffers, etc.) the exposure to streamed media and transmits the cached access(es) to the central facility. In some examples, the information transmitted by the media monitor includes a media indication (e.g., one or more media identifiers) and an identity of one or more users (e.g., one or more panelists).

Example methods, apparatus, systems, and articles of manufacture disclosed herein may also be used to generate reports indicative of media exposure metrics on one or more different types of streaming media devices (e.g., a Smart TV, a DVD player, an Apple TV®, a Roku™ media player, a Boxee™ media player, a Sony PlayStation™, Microsoft® Xbox®, a tablet PC, an Apple iPad®, etc.). For example, an audience measurement entity may generate media exposure metrics based on metadata extracted from the streaming media at the media device and/or similar devices, and/or audience identification information collected at the media presentation site. A report is then generated based on the media exposure to indicate exposure measurements (e.g., for a type of media (e.g., a genre)) using different types of media devices. Thus, for example, reports indicating the popularity of watching, for instance, sports events on certain types of media devices (e.g., streaming devices) can be compared to other popularities of watching sports events on other types of media devices (e.g., televisions that are not enabled for streaming).

Additionally or alternatively, popularities of different types of media across different device types may be compared. Such different types of media may be, for example, news, movies, television programming, on-demand media, Internet-based media, games, streaming games, genres, etc. Such comparisons may be made across any type(s) and/or numbers of streaming devices including, for example, cell phones, smart phones, dedicated portable multimedia playback devices, iPod® devices, tablet computing devices (e.g., an iPad®, etc.), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may include indicators of popularity of artist, genre, song, title, etc., across one or more user characteristics selected from one or more device type and/or one or more demographic segment(s) (e.g., one or more age group(s), one or more gender(s), and/or any other user characteristic(s)).

In some examples, the media exposure metrics are used to determine demographic reach of streaming media, ratings for streaming media, engagement indices for streaming media, user affinities associated with streaming media, broadcast media, and/or any other audience measure metric associated with streaming media, and/or one or more aspects and/or components of streaming media (e.g., an actor's name). In some examples, the media exposure metrics are audience share metrics indicative of percentages of audiences for different device types that accessed the same media. For example, the metrics may indicate a first percentage of an audience may be exposed to streaming news media via smart phones, while a second percentage of the audience may be exposed to the same streaming news media via tablets.

In some examples, the techniques disclosed herein for monitoring exposure to streaming media may additionally or alternatively be applied to traditional broadcast media distribution channels. For example, a media monitor may passively monitor a display of a media device (e.g., a television) that additionally or alternatively displays media other than streaming media (e.g., is displaying media received via a broadcast, is displaying media from a digital versatile disk (DVD), etc.). The media monitor may detect the presence of a video watermark and report the video watermark and/or data embedded within the video watermark to the central facility.

FIG. 1 is a block diagram of an example system constructed in accordance with the teachings of this disclosure for measuring exposure to media. The example system 100 of FIG. 1 monitors media provided by an example media provider 110 for presentation on an example media device via an example network 115. The example system 100 of FIG. 1 includes an example service provider 120, an example media device 155, an example alternative media device 162, an example cable 161, an example media monitor 163, an example media presentation device 164, an example alternative media monitor 165, and an example central facility 170 of an audience measurement entity.

The example media provider 110 of the illustrated example of FIG. 1 represents any one or more media provider(s) capable of providing media for presentation at the media device 155. The media provided by the media provider(s) 110 can be any type of media, such as audio, video, multimedia, webpages, etc. Additionally or alternatively, the media can correspond to live (e.g., broadcast) media, stored media (e.g., on-demand content), etc.

The example network 115 of the illustrated example is the Internet. Additionally or alternatively, any other network(s) communicatively linking the service provider 120 and the media device 155 such as, for example, a private network, a local area network (LAN), a virtual private network (VPN), etc., and/or any combination thereof, may be used. The network 115 may comprise any number of public and/or private networks using any type(s) of networking protocol(s).

The service provider 120 of the illustrated example of FIG. 1 provides media services to the media device 155 via, for example, web pages including links (e.g., hyperlinks, embedded media, etc.) to media provided by the media provider 110. In the illustrated example, the service provider 120 modifies the media provided by the media provider 110 prior to transmitting the media to the media device 155. In the illustrated example, the service provider 120 includes an example media identifier 125, an example transcoder 130, an example video metadata generator 135, an example video metadata embedder 137, and an example media transmitter 140.

While the illustrated example of FIG. 1 discloses an example implementation of the service provider 120, other example implementations of the service provider 120 may additionally or alternatively be used. For instance, any of the example implementations disclosed in U.S. patent application Ser. No. 13/341,646, U.S. patent application Ser. No. 13/341,661, U.S. patent application Ser. No. 13/443,596, U.S. patent application Ser. No. 13/793,991, U.S. patent application Ser. No. 13/445,961, U.S. patent application Ser. No. 13/793,974, U.S. patent application Ser. No. 13/472,170, U.S. patent application Ser. No. 13/793,983, U.S. patent application Ser. No. 13/767,548, U.S. patent application Ser. No. 13/793,959, U.S. patent application Ser. No. 13/778,108, U.S. Patent Application Ser. No. 61/813,019, and/or U.S. patent application Ser. No. 13/963,737, which are hereby incorporated by reference herein in their entirety, may be employed.

The media identifier 125 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The media identifier 125 of FIG. 1 extracts metering data (e.g., signatures, watermarks, etc.) from the media obtained from the media provider 110. For example, the media identifier 125 can implement functionality provided by a software development kit (SDK) to extract one or more audio watermarks embedded in the audio of the media obtained from the media provider 110. (For example, the media may include pulse code modulation (PCM) audio data or other types of audio data, etc.)

The example media identifier 125 of FIG. 1 determines (e.g., derives, decodes, converts, etc.) the metering data (e.g., media identifying information, source identifying information, etc.) included in or identified by a watermark embedded in the media and converts this metering data and/or the watermark itself into a text and/or binary format for inclusion in an ID3 tag and/or other data type (e.g., text, binary, etc.) for transmission as part and/or all of a video watermark embedded in the streaming media. In some examples, the code/watermark itself may be extracted and inserted in, for example, a text or binary format as the video watermark. Thus, the metadata and/or media-identifying metadata included in the ID3 tag of the video watermark may be a text or binary representation of a code, a watermark, and/or metadata or data identified by a code and/or watermark, etc. Additionally or alternatively, the watermark may be used to retrieve metering data from a local or remote database.

The example transcoder 130 of the illustrated example of FIG. 1 is implemented by a logic circuit such as a processor executing instructions, but could additionally or alternatively be implemented by an analog circuit, an Application Specific Integrated Circuit (ASIC), a Digital Signal Processor (DSP), a Field Programmable Logic Device (FPLD) (e.g., a Field Programmable Gate Array (FPGA)), and/or other circuitry. In some examples, the transcoder 130 and the media identifier 125 are implemented by the same physical processor. In the illustrated example, the transcoder 130 employs any appropriate technique(s) to transcode, convert, transform, and/or otherwise process the received media into a form suitable for streaming (e.g., a streaming format). For example, when example media is received using an MPEG 2 format, the transcoder 130 of the illustrated example transcodes the media in accordance with MPEG 4 audio/video compression for use with the HLS protocol.

The video metadata generator 135 of the illustrated example of FIG. 1 is implemented by a logic circuit such as a processor executing instructions, but could additionally or alternatively be implemented by an analog circuit, ASIC, DSP, FPLD, and/or other circuitry. In some examples, the video metadata generator 135, the transcoder 130, and the media identifier 125 are implemented by the same physical processor. In the illustrated example, the video metadata generator 135 generates video metadata (e.g., a video watermark) based on the metadata identified by the media identifier 125.

The video metadata embedder 137 of the illustrated example of FIG. 1 is implemented by a logic circuit such as a processor executing instructions, but could additionally and/or alternatively be implemented by an analog circuit, ASIC, DSP, FPLD, and/or other circuitry. In some examples, the transcoder 130, the media identifier 125, the video metadata generator 135, and the video metadata embedder 137 are implemented by the same physical processor. In the illustrated example, the video metadata embedder 137 embeds the metadata generated by the video metadata generator 135 into the transport stream(s) carrying the streaming media. In the illustrated example, the video metadata embedder 137 embeds the video metadata into a video channel of the media by, for example, overlaying and or otherwise modifying the video stream to include the video metadata. For example, the video metadata embedder 137 can overlay a video watermark corresponding to the metering metadata into a video portion of the transport stream(s) that is (are) to stream the media in accordance with the HLS or other appropriate streaming protocol.

The media transmitter 140 of the illustrated example of FIG. 1 is implemented by a logic circuit such as a processor executing instructions, but could additionally or alternatively be implemented by an analog circuit, ASIC, DSP, FPLD, and/or other circuitry. In some examples, the transcoder 130, the media identifier 125, the video metadata generator 135, the video metadata embedder 137, and the media transmitter 140 are implemented by the same physical processor. The media transmitter 140 of the illustrated example of FIG. 1 employs any appropriate technique(s) to select and/or stream the media to a requesting device, such as the media device 155. For example, the media transmitter 140 of the illustrated example selects media that has been identified by the media identifier 125, transcoded by the transcoder 130 and undergone metadata embedding by the video metadata embedder 137. The media transmitter 140 then streams the media to the media device 155 via the network 115 using HLS or any other streaming and/or broadcast protocol.

In some examples, the media identifier 125, the transcoder 130, the video metadata generator 135, and/or the video metadata embedder 137 prepare media for streaming regardless of whether (e.g., prior to) a request for the media is received. In such examples, the already-prepared media is stored in a data store of the service provider 120 (e.g., such as in a flash memory, magnetic media, optical media, etc.). In some such examples, the media transmitter 140 prepares a transport stream for streaming the already-prepared media to the requesting media device when a request is received from the media device. In other examples, the media identifier 125, the transcoder 130, the video metadata generator 135, and/or the video metadata embedder 137 prepare the media for streaming in response to a request received from the media device.

The media device 155 of the illustrated example of FIG. 1 is a computing device that is capable of presenting streaming media provided by the media transmitter 140 via the network 115. The media device 155 of the illustrated example is capable of directly presenting media (e.g., via a display). However, in some examples, the media device 155 presents the media on separate media presentation equipment (e.g., speakers, a display, etc.). Media devices are typically consumer electronics devices. For example, the media device 155 of the illustrated example is a tablet such as an Apple iPad®, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., any generation of Xbox®, PlayStation®, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

In the illustrated example, the media device 155 is instrumented with media monitoring functionality. The example media monitoring functionality monitors media presented by the media device 155 and transmits metering information (e.g., media-identifying metadata) to the central facility 170. In some examples, the media monitoring functionality transmits an identifier of a user (e.g., a panelist) of the media device 155 and/or an identifier of the media device 155 to the central facility 170. Thus, as used herein a "media device" may or may not be able to present media without assistance from a second device. In some examples, the media presenter 210 includes a display 159 for presenting media.

The example media device 155 of the illustrated example of FIG. 1 includes a display 159. The display 159 may be, for example, a liquid crystal display (LCD), a light emitting diode display (LED), a plasma display panel (PDP), a digital light processing display (DLP), etc. In some examples the display 159 includes speakers for presenting audio. In some examples, the display 159 is implemented externally from the media device 155 and/or may be implemented by a separate media presentation system. For example, the display 159 may be implemented by a television presenting the media. In some examples, the display is implemented by a media output port such as, for example, a High Definition Media Interface (HDMI) port.

In addition to and/or as an alternative to the example media device 155, the illustrated example of FIG. 1 includes an alternative example media device 162. The alternative example media device 162 of the illustrated example of FIG. 1 is a media device that does not include on-device media presentation functionality (e.g., does not include an integrated display and/or speakers). As such, the example alternative media device 162 outputs media via an audio and/or video output. In the illustrated example, the audio and/or video output is a High Definition Media Interface (HDMI) output. However, any other type of audio and/or video output may additionally or alternatively be used such as, for example, a digital video interface (DVI), a Sony/Phillips Digital Interface Format (S/PDIF), a digital coaxial cable, an s-video output, a composite video output, a component video output, etc. In the illustrated example, the example alternative media device 162 includes media monitoring functionality to identify audio and/or video that is to be output via the audio and/or video output.

In the illustrated example, the audio and/or video output by the alternative example media device 162 is transmitted to an example media presentation device 164 via a cable 161. The example cable 161 of the illustrated example of FIG. 1 matches the type of audio and/or video output of the example alternative media device 162. However, in some examples, the transmission of the audio and/or video from the example alternative media device 162 to the example media presentation device 164 is implemented using wireless communications.

In some examples, the example alternative media device 162 does not include media monitoring functionality to identify audio and/or video. In some such examples, the example media monitor 163 intermediate the example alternative media device 162 and the example media presentation device 164 is used. The example media monitor 163 intercepts audio and/or video by monitoring the audio and/or video transmitted via the cable 161 from the example media device 162 to the example media presentation device 164. In the illustrated example, the example media monitor 163 monitors the audio and/or video by capturing audio and/or video transmitted from the media device 155 to the media presentation device 164 via the cable 161.

In examples where the example alternative media device 162 and the example media presentation device 164 communicate wirelessly, the example media monitor 163 monitors the wireless communication(s) between the example alternative media device 162 and the example media presentation device 164.

The example media presentation device 164 of the illustrated example of FIG. 1 includes media presentation functionality (e.g., an integrated display and/or speakers). In the illustrated example, the example media presentation device 164 receives media from a separate media device (e.g., a set top box, a digital video disc (DVD) player, etc.) for presentation. In contrast to the example media device 155, the example media presentation device 164 does not generate its own media for presentation. That is, the example media presentation device 164 does not include streaming functionality, etc. and, instead, presents media that is received via an audio and/or video input (e.g., the audio and/or video received from the example alternative media device 162 via the example cable 161). In some examples, the example media presentation device 164 includes media monitoring functionality to identify media presented by the example media presentation device 164.

The illustrated example of FIG. 1 includes an alternative media monitor 165. The example alternative media monitor 165 of FIG. 1 is a passive media monitor that does not include media presentation functionality. The example alternative media monitor 165 includes media monitoring functionality such as, for example, a camera, to monitor media presented via a separate media device (e.g., the example media presentation device 164). In the illustrated example, the example alternative media monitor 165 is implemented as a closed circuit security camera. However, the example alternative media monitor 165 may be implemented in any other fashion.

The central facility 170 of the audience measurement entity of the illustrated example of FIG. 1 includes an interface to receive reported metering information (e.g., metadata) from, for example, the media device 155, via the network 115. Although the following examples refer to an audience measurement entity, any entity may fill this role. In the illustrated example, the central facility 170 includes an Internet interface 171 to receive Internet requests (e.g., a HyperText Transfer Protocol (HTTP) message(s)) that include the metering information. Additionally or alternatively, any other method(s) to receive metering information may be used such as, for example, an HTTP Secure protocol (HTTPS), a file transfer protocol (FTP), a secure file transfer protocol (SFTP), etc.

In the illustrated example, the central facility 170 instructs (as represented with line 172) the metadata embedder 137 and/or, more generally, the service provider 120 to embed a video watermark in media to be streamed. In some examples, the video watermark includes and/or is formatted as an ID3 tag. However, any other format of tag and/or instructions may additionally or alternatively be used. In some examples, the video metadata generator 135, and/or the video metadata embedder 137 is/are provided to the service provider 120 by the audience measurement entity.

In the illustrated example, the central facility 170 stores and analyzes metering information received from a plurality of different media devices and/or media monitors. For example, the central facility 170 may sort and/or group metering information by media provider 110 (e.g., by grouping all metering data associated with a particular media provider 110). Any other processing of metering information may additionally or alternatively be performed. In the illustrated example, the central facility 170 is associated with an audience measurement company (e.g., an audience measurement entity such as, for example. The Nielsen Company (US), LLC) and is not involved with the delivery of media to the media device.

Figure 2:
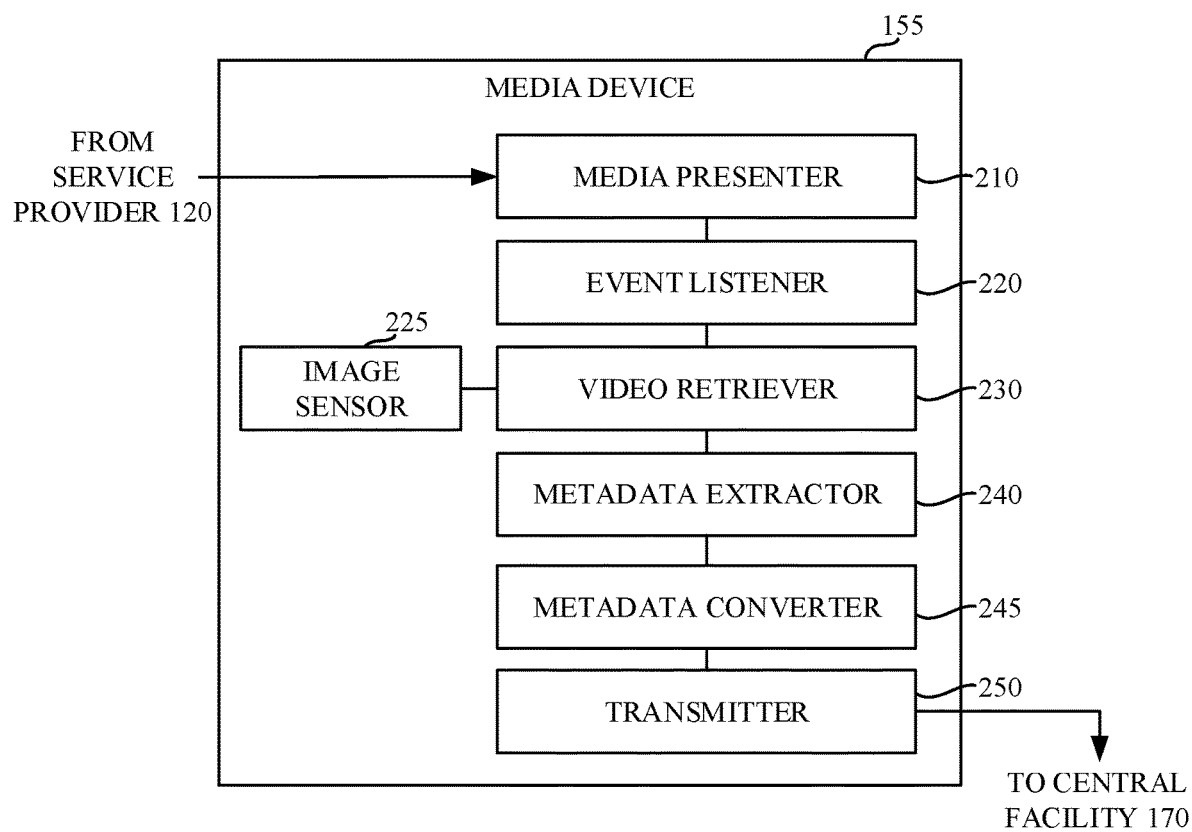
FIG. 2 is a block diagram of an example implementation of the example media device of FIG. 1.

FIG. 2 is a block diagram of an example implementation of the example media device 155 of FIG. 1. The example media device 155 of the illustrated example of FIG. 2 includes an example media presenter 210, an example event listener 220, an example image sensor 225, an example video retriever 230, an example metadata extractor 240, an example metadata converter 245, and an example transmitter 250. However, some implementations of the media device 155 may omit particular elements of the media device 155. For example, the example alternative media device 162 may omit the display 159 in favor of an audio and/or video output via an audio and/or video port (e.g., an HDMI port).

The media presenter 210 of the illustrated example of FIG. 2 is implemented by a processor executing instructions, but it could additionally or alternatively be implemented by an analog circuit, an ASIC, DSP, FPLD, and/or other circuitry. In the illustrated example, the media presenter 210 interacts with a QuickTime® application programming interface (API) to display media via the media device 155. While in the illustrated example, the QuickTime® API is used, any other media presenting framework may additionally or alternatively be employed. For example, the example media presenter 210 may interact with an Adobe® Flash® media presentation framework.

The example event listener 220 of the illustrated example of FIG. 2 is implemented by a logic circuit such as a processor executing instructions, but it could additionally or alternatively be implemented by an analog circuit, an ASIC, DSP, FPLD, and/or other circuitry. In some examples, the media presenter 210 and the event listener 220 are implemented by the same physical processor. In the illustrated example, the example event listener 220 interfaces with JavaScript functions to enable reception of and/or listening for an event notification. An event notification is any notification of activity of the media presenter 210. Event notifications may be triggered when, for example, a new webpage is loaded, media is presented, a user input is detected, etc. While JavaScript is used to listen for event notifications in the illustrated example, any other framework, such as, for example, ActiveX, Microsoft Silverlight, etc., may be used to listen for event notifications. In some examples, the event notification is an indication that media including a video watermark is presented. Thus, the event listener 220 may, in some examples, listen for events associated with the video retriever 230 to determine if a video watermark is presented. In some examples, the event notification is a notification that a threshold time has elapsed.

The image sensor 225 of the illustrated example of FIG. 2 is implemented by an image sensing device such as, for example, a camera. However, any other type of image sensing device may additionally or alternatively be used such as, for example, a semiconductor charge coupled device (CCD) sensor, a complementary metal oxide semiconductor (CMOS) sensor, etc. In some examples, the image sensor 225 interfaces with the video retriever 230 to gather images for video metadata identification. For example, when the media presenter 210 is implemented by a device separate from the media device 155, the image sensor 225 may enable retrieval of the image presented by the separate device.

The video retriever 230 of the illustrated example of FIG. 2 is implemented by a logic circuit such as a processor executing instructions, but it could additionally or alternatively be implemented by an analog circuit, an ASIC, DSP, FPLD, and/or other circuitry. In some examples, the media presenter 210, the event listener 220, and the video retriever 230 are implemented by the same physical processor. In the illustrated example, the video retriever 230 retrieves one or more images from the media presenter 210 upon detection of an event notification by the event listener 220. In the illustrated example, the video retriever 230 retrieves the images by taking a screenshot of the display 159 of the media device 155. Image processing techniques and/or other techniques (e.g., operating system queries) may be used to determine operational information describing whether, for example, media displayed by the media presenter 210 is fully or partially visible (e.g., the media presenter 210 is fully viewable, the media presenter 210 is 50% viewable, the media presenter 210 is not viewable, etc.), whether the media presenter 210 is in the foreground or background, etc. In some examples, the operational information is transmitted to the audience measurement entity to enable computation of additional media presentation metrics (e.g., whether users view media while it is in a windowed state or in a full-screen state, etc.). In some other examples, the video retriever 230 may retrieve the images from the image sensor 225.

The metadata extractor 240 of the illustrated example of FIG. 2 is implemented by a logic circuit such as a processor executing instructions, but it could additionally or alternatively be implemented by an analog circuit, an ASIC, DSP, FPLD, and/or other circuitry. In some examples, the media presenter 210, the event listener 220, the video retriever 230, and the metadata extractor 240 are implemented by the same physical processor. In the illustrated example, the metadata extractor 240 inspects video retrieved by the video retriever 230 to identify video metadata (e.g., a video watermark). In the illustrated example, the video watermark is implemented within the chroma key of the video signal. However, the video watermark may be implemented in any other fashion.

The metadata converter 245 of the illustrated example of FIG. 2 is implemented by a logic circuit such as a processor executing instructions, but it could additionally or alternatively be implemented by an analog circuit, an ASIC, DSP, FPLD, and/or other circuitry. In some examples, the media presenter 210, the event listener 220, the video retriever 230, the metadata extractor 240, and the metadata converter 245 are implemented by the same physical processor. In the illustrated example, the metadata converter 245 converts the metadata retrieved by the metadata extractor 240 into a format for transmission to the central facility 170. For example, the metadata converter 245 may encrypt, decrypt, compress, modify, etc., the metadata and/or portions of the metadata to, for example, reduce the amount of data to be transmitted to the central facility 170. In some examples, the metadata extractor 240 and/or the metadata converter 245 are omitted from the media device 155. In such an example, rather than sending an extracted video watermark and/or other media-identifying information to the central facility 170, the media device 155 transmits the image retrieved by the video retriever 230. The image may then be processed by the central facility 170 to identify the video watermark or other media-identifying information. Such an approach is advantageous because it reduces the amount of processing that is performed by the media device 155, thereby enabling the media device 155 to be implemented in a more inexpensive fashion.

The transmitter 250 of the illustrated example of FIG. 2 is implemented by a logic circuit such as a processor executing instructions, but it could additionally or alternatively be implemented by an analog circuit, an ASIC, DSP, FPLD, and/or other circuitry. In some examples, the media presenter 210, the event listener 220, the video retriever 230, the metadata extractor 240, the metadata converter 245, and the transmitter 250 are implemented by the same physical processor. In the illustrated example, the transmitter 250 transmits the video watermark and/or other media-identifying information to the central facility 170. In some examples, the transmitter 250 additionally or alternatively transmits an image retrieved by the video retriever 230. In the illustrated example, the transmitter 250 transmits user and/or device identifying information to the central facility 170. Transmitting user and/or device identifying information to the central facility 170 enables correlation of the media presentation with a user and/or demographic of a user. While the video watermark and/or other media-identifying information is transmitted in substantially real-time in the illustrated example, in some examples, the video watermark and/or other media-identifying information is stored, cached, and/or buffered before being transmitted to the central facility 170. In some examples, the video watermark and/or other media-identifying information is encrypted before transmission by the transmitter 250. Encrypting the media-identifying information prevents third parties from gaining access to the video watermark, other media identifying information, and/or the user and/or device identifier(s). In some examples, the transmitter 250 transmits the operational information identified by the video retriever 230.

Figure 3:
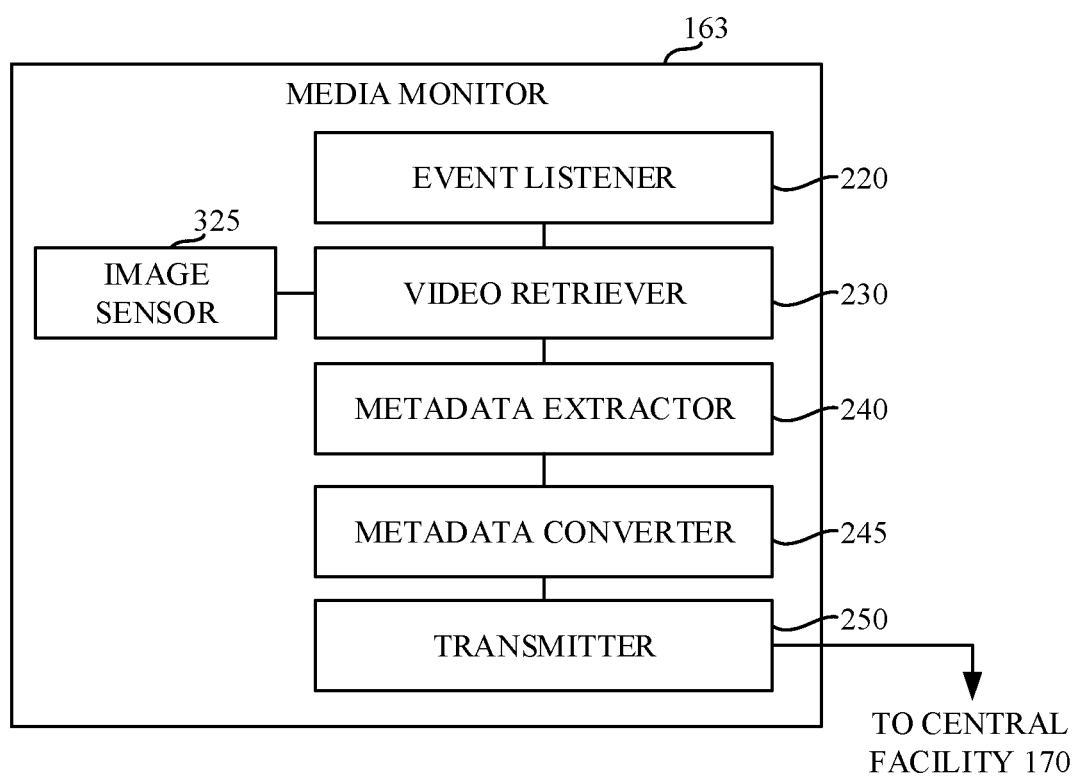
FIG. 3 is a block diagram of an example implementation of the example monitor of FIG. 1.

FIG. 3 is a block diagram of an example implementation of the example monitor 163 of FIG. 1. The example monitor 163 includes the example event listener 220, the example image sensor 325, the example video retriever 230, the example metadata extractor 240, the example metadata converter 245, and the example transmitter 250. In contrast to the media device 155 of FIGS. 1 and/or 2, the example monitor 163 does not include media presentation functionality (e.g., a media presenter such as, for example, the example media presenter 210 of FIG. 2).

In the illustrated example of FIG. 3, the example image sensor 325 is placed in a location such that the example image sensor has optimal line of sight of one or more video displaying devices (e.g., a television). As such, in acoustically noisy environments such as a bar or a sports stadium, video metadata may still be collected. In such an implementation, the image sensor 325 may be a security camera. Using a security camera has an added advantage that the infrastructure and/or wiring to support retrieval and/or transmission of an image from the image sensor 325 (e.g., the security camera) to the video retriever 230 may already be implemented as part of the security system.

In some examples, the image sensor 325 is implemented as a pass through device that receives an image signal from a first media device that is to be presented by a second media device. For example, the image sensor may receive a video signal intermediate a set top box and a television. That is, the image sensor 325 may receive an input from a media device (e.g., a set top box) and relay that input to a media presentation device (e.g., a television) while also extracting an image. Using the image sensor 325 as a pass through device has the added advantage that modification of an existing media presentation system (e.g., a set top box and a television) to install the image sensor 325 and/or, more generally, the media device 155, is minimal. In some examples, the image sensor 325 does not relay the video signal to the media presentation device (e.g., the television), as the television may receive the video signal via a separate input from the media device (e.g., the set top box). In some examples, the image sensor 325 receives the video signal as an analog input (e.g., composite video, s-video, component video, etc.). However, in some other examples, the image sensor 325 receives the video signal as a digital input (e.g., a high definition multimedia interface (HDMI), a digital video interface (DVI), etc.).

Figure 4:
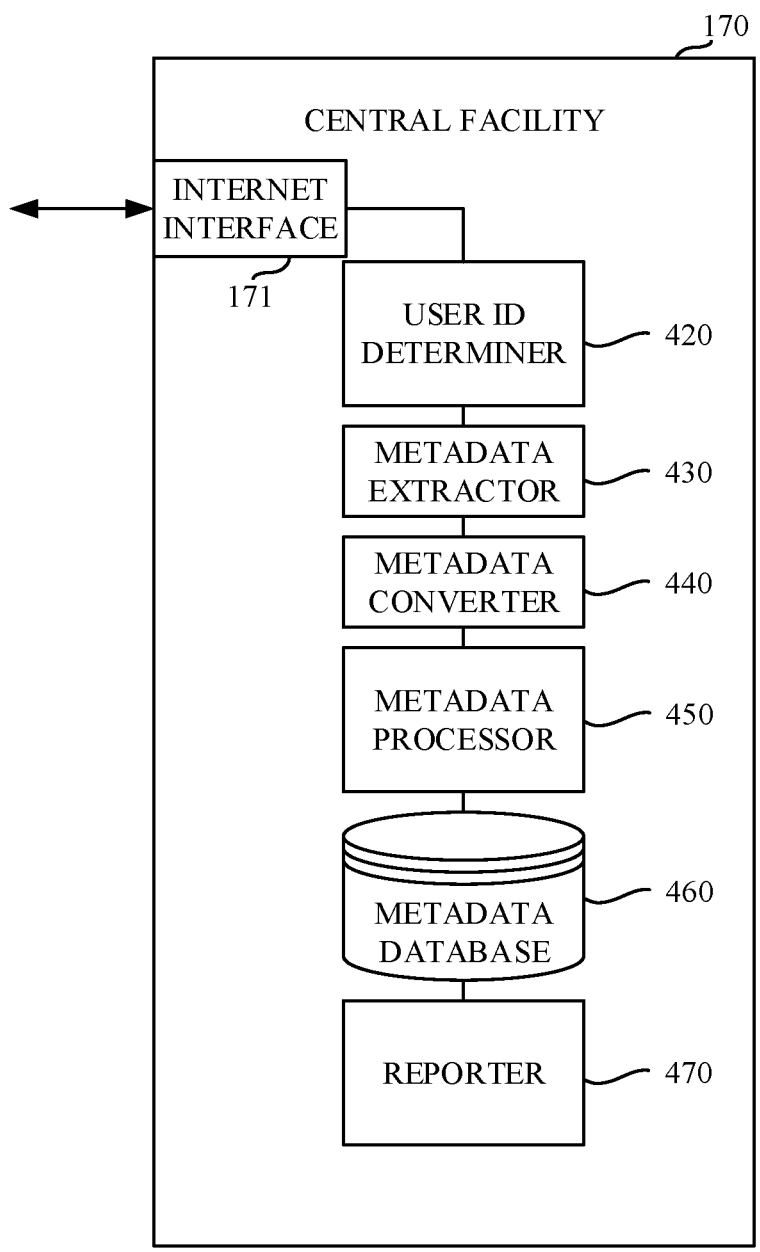
FIG. 4 is a block diagram of an example implementation of the central facility of FIG. 1.

FIG. 4 is a block diagram of an example implementation of the example central facility 170 of FIG. 1. The central facility 170 of the illustrated example of FIG. 4 includes the example Internet interface 171, an example user ID determiner 420, an example metadata extractor 430, an example metadata converter 440, an example metadata processor 450, an example metadata database 460, and an example reporter 470.

The example Internet interface 171 of the illustrated example of FIG. 4 is implemented by a logic circuit such as a processor executing instructions, but it could additionally or alternatively be implemented by an analog circuit, an ASIC, DSP, FPLD, and/or other circuitry. In the illustrated example, the example internet interface implements a web server. In the illustrated example, the example Internet interface 171 receives monitoring information from the example media device 155 and/or the example media monitor 163. In the illustrated example, the monitoring information is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc.

The example user ID determiner 420 of the illustrated example of FIG. 4 is implemented by a logic circuit such as a processor executing instructions, but it could additionally or alternatively be implemented by an analog circuit, an ASIC, DSP, FPLD, and/or other circuitry. In some examples, the example Internet interface 171 and the example user ID determiner 420 are implemented by the same physical processor. In the illustrated example, the example user ID determiner 420 identifies a user ID based on information received from the media device 155 and/or media monitor 163 in association with media presentation information (e.g., the video watermark, an image containing the video watermark, metadata encoded within the video watermark, etc.).

While, in the illustrated example, the user ID determiner 420 identifies a user ID (e.g., thereby identifying a user of the example media device 155), the user ID determiner 420 may, in some examples, identify the media device 155. In some examples, the example media device 155 may be associated with multiple users and/or panelists. For example, the media device 155 may be a tablet that is shared amongst members of a family. The demographic information associated with the family may be more generic (e.g., the family associated with the media device lives in Bloomingdale, IL) than demographic information associated with a particular person within the family (e.g., the user of the media device lives in Bloomingdale, IL, is a Caucasian male, and is interested in board games).

The example metadata extractor 430 of the illustrated example of FIG. 4 is implemented by a logic circuit such as a processor executing instructions, but it could additionally or alternatively be implemented by an analog circuit, an ASIC, DSP, FPLD, and/or other circuitry. In some examples, the Internet interface 171, the user ID determiner 420, and the metadata extractor 430 are implemented by the same physical processor. In the illustrated example, the metadata extractor 430 inspects images received from the media device 155 and/or the media monitor 163 by the Internet interface 171 to identify video metadata (e.g., a video watermark). In the illustrated example, the video watermark is implemented within the chroma key of the image. However, the video watermark may be implemented in any other fashion.

The example metadata converter 440 of the illustrated example of FIG. 4 is implemented by a logic circuit such as a processor executing instructions, but it could additionally or alternatively be implemented by an analog circuit, an ASIC, DSP, FPLD, and/or other circuitry. In some examples, the Internet interface 171, the user ID determiner 420, the metadata extractor 430, and the metadata converter 440 are implemented by the same physical processor. In the illustrated example, the metadata converter 440 converts the metadata retrieved by the metadata extractor 440 into a format for use by the metadata processor 450. For example, the metadata converter 440 may convert, compress, modify, etc., the metadata and/or portions of the metadata to, for example, reduce the amount of data to be processed by the metadata processor 450. In some examples, the metadata extractor 430 and/or the metadata converter 440 are omitted from the central facility 170. In such an example, rather than receiving an image from the media device 155 and/or the media monitor 163, the central facility 170 receives pre-processed metadata (e.g., metadata derived by the metadata extractor 240 and/or the metadata converter 245 of FIGS. 2 and/or 3).

The example metadata processor 450 of the illustrated example of FIG. 4 is implemented by a logic circuit such as a processor executing instructions, but it could additionally or alternatively be implemented by an analog circuit, an ASIC, DSP, FPLD, and/or other circuitry. In some examples, the Internet interface 171, the user ID determiner 420, the metadata extractor 430, the metadata converter 440, and the metadata processor 450 are implemented by the same physical processor. In the illustrated example, the metadata processor 450 processes the received metadata and user IDs to associate identified media with a demographic associated with the user IDs.

The example metadata database 460 of the illustrated example of FIG. 4 may be implemented by any device for storing data such as, for example, flash memory, magnetic media, optical media, etc. Furthermore, the data stored in the metadata database 460 may be in any data format such as, for example, binary data, comma delimited data, tab delimited data, structured query language (SQL) structures, etc. In the illustrated example, the example metadata database 460 stores metadata (e.g., codes, signatures, etc.) used to identify media. In some examples, the metadata database 460 additionally stores user identifying information and/or demographics such that received user identifiers can be translated into demographic information.

The example reporter 470 of the illustrated example of FIG. 4 is implemented by a logic circuit such as a processor executing instructions, but it could additionally or alternatively be implemented by an analog circuit, an ASIC, DSP, FPLD, and/or other circuitry. In some examples, the Internet interface 171, the user ID determiner 420, the metadata extractor 430, the metadata converter 440, the metadata processor 450, and the reporter 470 are implemented by the same physical processor. In the illustrated example, the example reporter 470 prepares media measurement reports indicative of the exposure and/or demographics identified via the received monitoring information.

While an example manner of implementing the example service provider 120, the example media device 155, the example media monitor 163, and/or the example central facility 170 is/are illustrated in FIGS. 1, 2, 3, and/or 4, one or more of the elements, processes and/or devices illustrated in FIGS. 1, 2, 3, and/or 4 may be combined, divided, re-arranged, omitted, eliminated and/or implemented in any other way. Further, the example media identifier 125, the example transcoder 130, the example video metadata generator 135, the example video metadata embedder 137, the example media transmitter 140, and/or, more generally, the example service provider 120 of FIG. 1, the example media presenter 210, the example event listener 220, the example image sensor 325, the example video retriever 230, the example metadata extractor 240, the example metadata converter 245, the example transmitter 250, and/or, more generally, the example media device 155 of FIGS. 1 and/or 2, the example event listener 220, the example image sensor 325, the example video retriever 230, the example metadata extractor 240, the example metadata converter 245, the example transmitter 250, and/or, more generally, the example media monitor 163 of FIGS. 1 and/or 3, the example Internet interface 171, the example user identifier determiner 420, the example metadata extractor 430, the example metadata converter 440, the example metadata processor 450, the example metadata database 460, the example reporter 470, and/or, more generally, the example central facility 170 of FIGS. 1 and/or 4 may be implemented by hardware, software, firmware and/or any combination of hardware, software, and/or firmware. Thus, for example, any of the example media identifier 125, the example transcoder 130, the example video metadata generator 135, the example video metadata embedder 137, the example media transmitter 140, and/or, more generally, the example service provider 120 of FIG. 1, the example media presenter 210, the example event listener 220, the example image sensor 225, the example video retriever 230, the example metadata extractor 240, the example metadata converter 245, the example transmitter 250, and/or, more generally, the example media device 155 of FIGS. 1 and/or 2, the example event listener 220, the example image sensor 325, the example video retriever 230, the example metadata extractor 240, the example metadata converter 245, the example transmitter 250, and/or, more generally, the example media monitor 163 of FIGS. 1 and/or 3, the example Internet interface 171, the example user identifier determiner 420, the example metadata extractor 430, the example metadata converter 440, the example metadata processor 450, the example metadata database 460, the example reporter 470, and/or, more generally, the example central facility of FIGS. 1 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media identifier 125, the example transcoder 130, the example video metadata generator 135, the example video metadata embedder 137, the example media transmitter 140, the example media presenter 210, the example event listener 220, the example image sensor 225, the example video retriever 230, the example metadata extractor 240, the example metadata converter 245, the example transmitter 250, the example Internet interface 171, the example user identifier determiner 420, the example image sensor 325, the example metadata extractor 430, the example metadata converter 440, the example metadata processor 450, the example metadata database 460, and/or the example reporter 470 is/are hereby expressly defined to include a tangible computer readable storage device or storage disk such as a memory, a digital versatile disk (DVD), a compact disk (CD), a Blu-ray disk, etc. storing the software and/or firmware. Further still, the example service provider 120, the example media device 155, the example media monitor 163, and/or the example central facility 170 of FIGS. 1, 2, 3, and/or 4 may include one or more elements, processes and/or devices in addition to, or instead of, those illustrated in FIGS. 1, 2, 3, and/or 4, and/or may include more than one of any or all of the illustrated elements, processes and devices.

Figure 5:
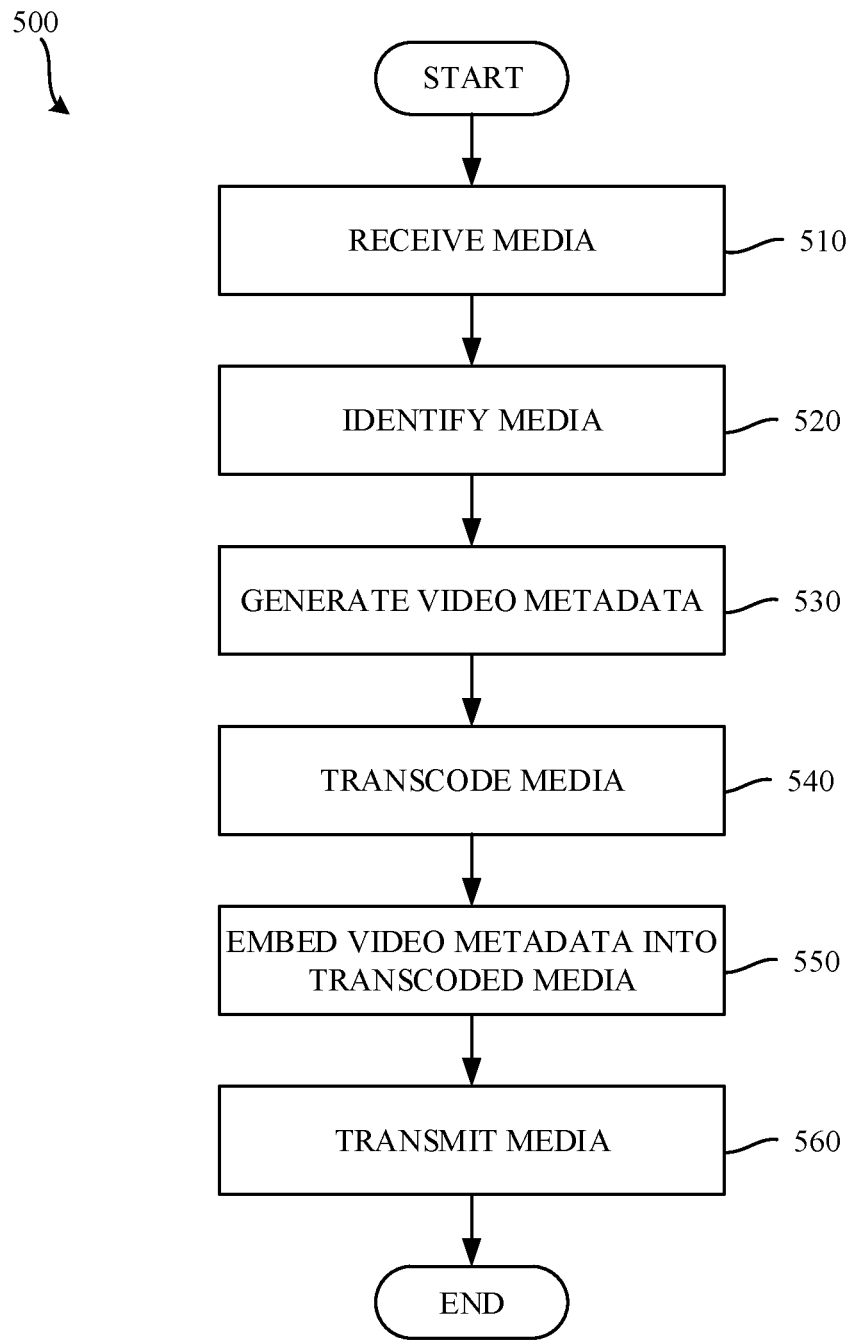
FIG. 5 is a flowchart representative of example machine-readable instructions that may be executed to implement the example service provider of FIG. 1.
Figure 6:
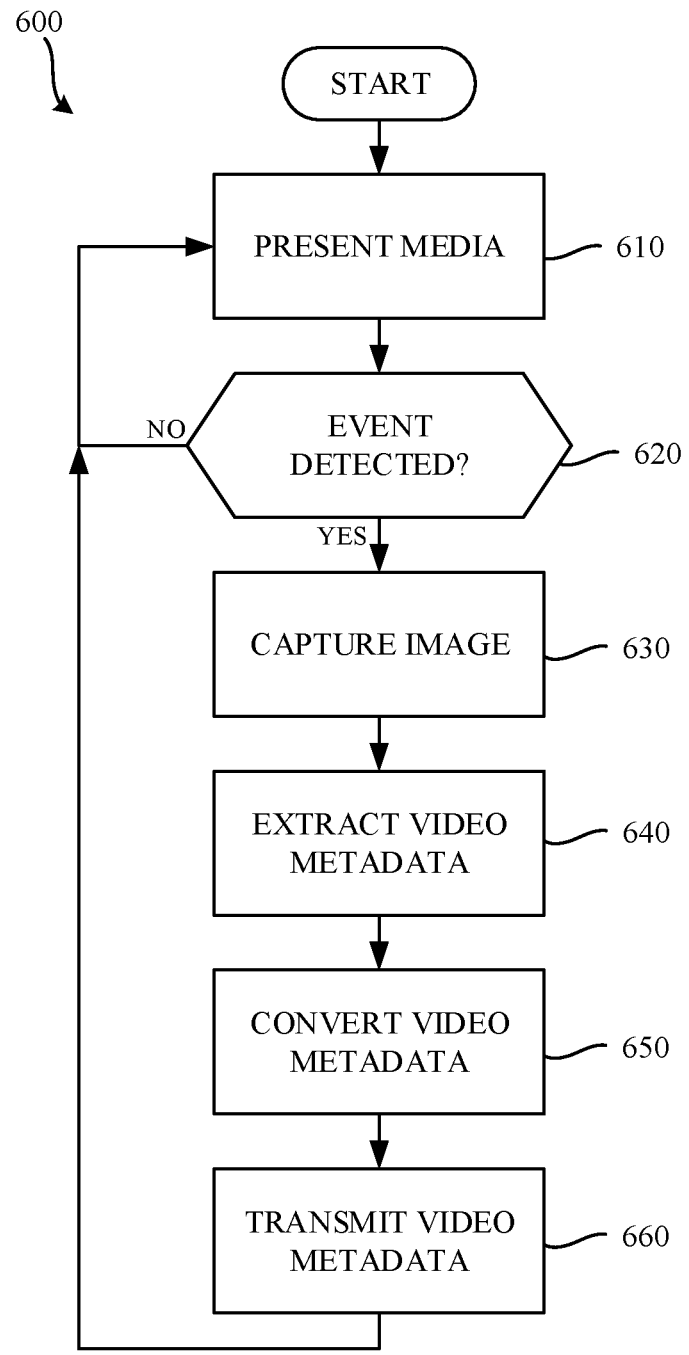
FIG. 6 is a flowchart representative of example machine-readable instructions that may be executed to implement the example media device of FIGS. 1 and/or 2.
Figure 7:
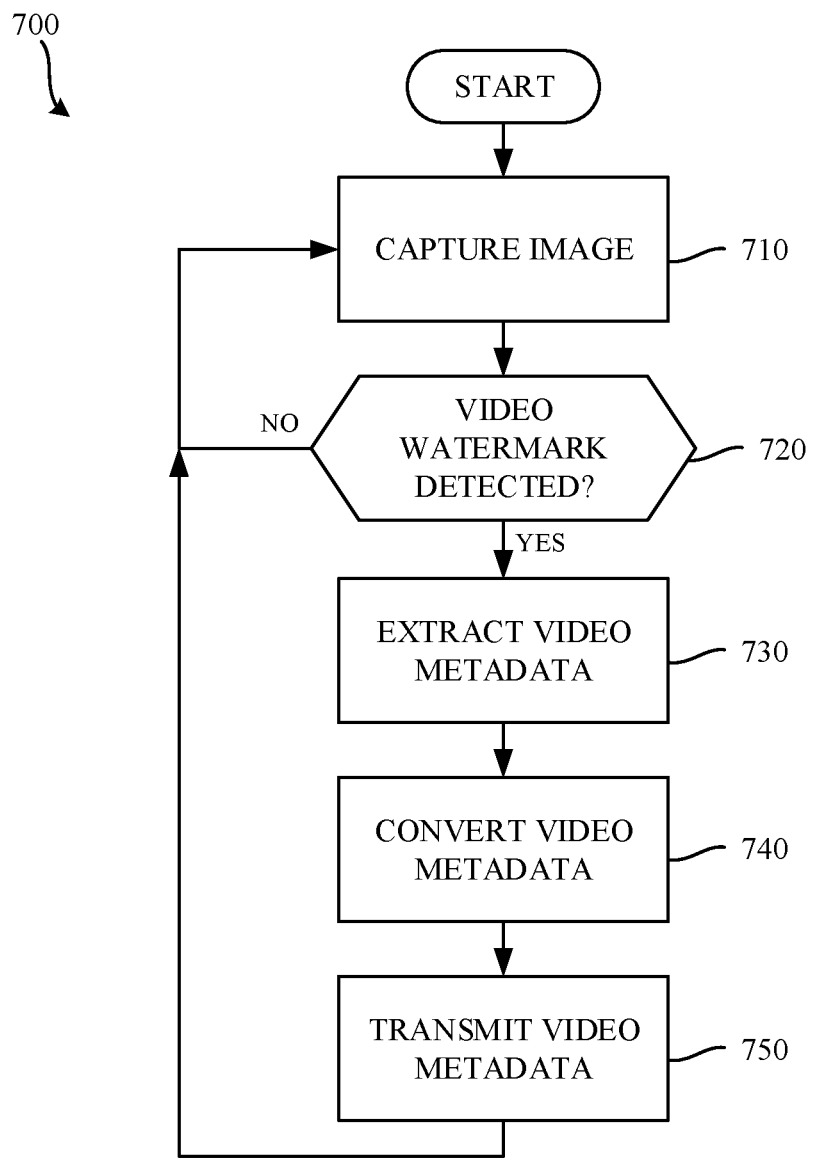
FIG. 7 is a flowchart representative of example machine-readable instructions that may be executed to implement the example media device of FIGS. 1 and/or 2, and/or the example media monitor of FIGS. 1 and/or 3.
Figure 8:
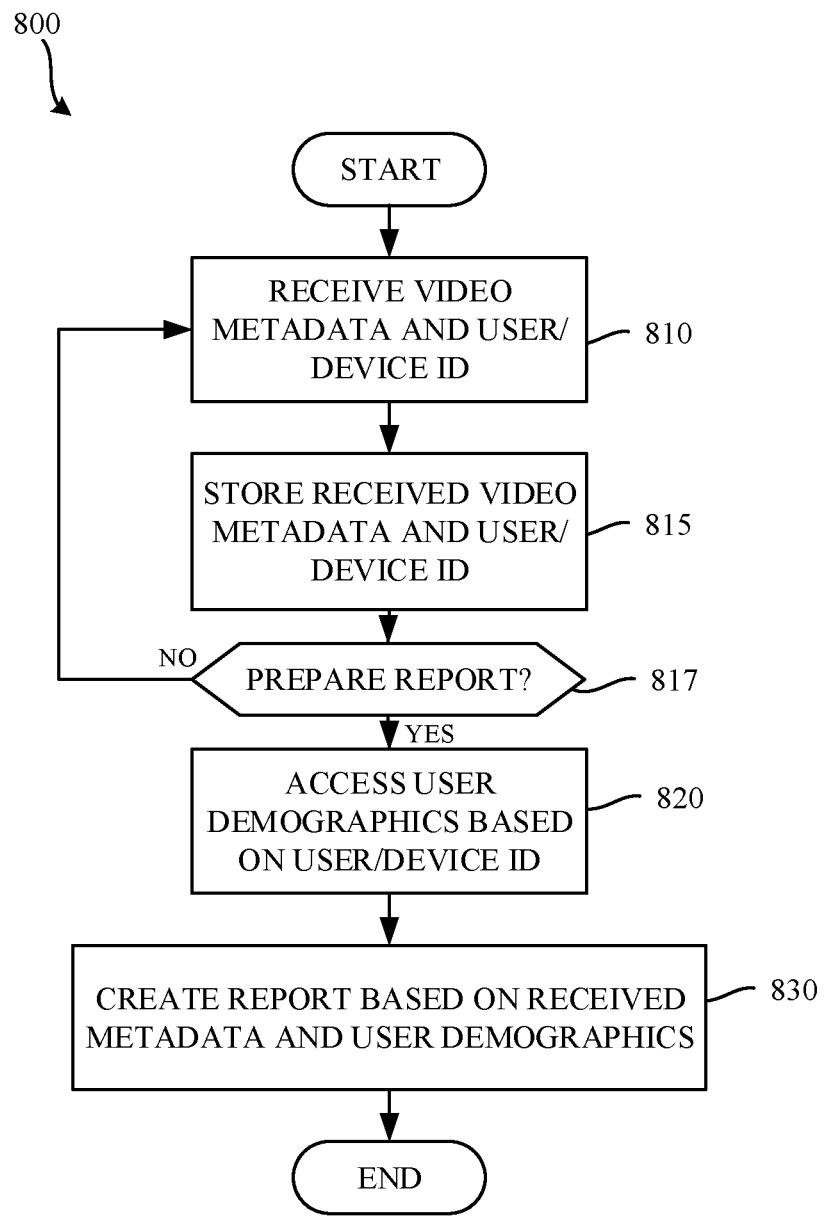
FIG. 8 is a flowchart representative of example machine-readable instructions that may be executed to implement the example central facility of FIGS. 1 and/or 4.

A flowchart representative of example machine readable instructions for implementing the example service provider 120 of FIG. 1 is shown in FIG. 5. Flowcharts representative of example machine readable instructions for implementing the example media device 155 and/or the example media monitor 163 of FIGS. 1, 2, and/or 3 are shown in FIGS. 6, 7, and/or 9. Flowcharts representative of example machine readable instructions for implementing the example central facility 170 of FIGS. 1 and/or 4 are shown in FIGS. 8 and/or 10. In these examples, the machine readable instructions comprise a program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 5, 6, 7, 8, 9, and/or 10, many other methods of implementing the example service provider 120, the example media device 155, the example media monitor 163, and/or the example central facility 170 may alternatively be used. For example, the order of execution of the blocks may be changed, and/or some of the blocks described may be changed, eliminated, or combined.

As mentioned above, the example processes of FIGS. 5, 6, 7, 8, 9, and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 5, 6, 7, 8, 9, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 5 is a flowchart representative of example machine-readable instructions which may be executed to implement the example service provider of FIG. 1. Execution of the example machine-readable instructions 500 of FIG. 5 begins with the media identifier 125 of the service provider 120 receiving the media from the media provider 110 (block 510). In the illustrated example, the media is received as it is broadcast (e.g., live). However, in some examples, the media is stored and/or cached by the media identifier 125.

The media identifier 125 of the illustrated example then identifies the media (block 520). The media identifier 125 identifies the media by extracting metering data (e.g., signatures, watermarks, etc.) from the media. Based on the extracted metering data, the media identifier 125 generates metadata (block 530). In the illustrated example, the metadata is generated in a video watermark format. However, any other metadata format may additionally or alternatively be used. Further, in the illustrated example, the metadata is generated based on the extracted metering data. However, in some examples, the metadata may be generated by querying an external source using some or all of the extracted metering data.

The media is then reformatted by the transcoder 130 of the service provider 120 (block 540). In the illustrated example, the media is transcoded from one format into another. For example, the media may be reformatted into an MPEG2 transport stream that may be transmitted via HTTP live streaming (HLS). The metadata embedder 135 of the service provider 120 embeds the video metadata into a video stream of the media (block 550). In the illustrated example, the metadata is embedded into a video stream of the media using a chroma key. However, the metadata may be embedded into the video stream in any other fashion. The media is then transmitted by the media transmitter 140 of the service provider 120 (block 560). In the illustrated example, the media is transmitted using HTTP live streaming (HLS). However, any other format and/or protocol for transmitting (e.g., broadcasting, unicasting, multicasting, etc.) media may additionally or alternatively be used.

FIG. 6 is a flowchart representative of example machine-readable instructions which may be executed to implement the example media device of FIGS. 1 and/or 2. The example program 600 of the illustrated example of FIG. 6 begins at block 610 when the media presenter 210 presents media (block 610). In the illustrated example, the media presenter 210 presents the media via an integrated display of the media device, such as the example display 159. However, the example media presenter 210 may present and/or otherwise output the media in any other fashion. For example, the example media presenter 210 may output the media via audio and/or video outputs of the media device for presentation via a separate media device.

While media is being presented (block 610) the example event listener 220 monitors for an event (block 620). In the illustrated example, the event is a time-based event (e.g., an event is triggered every 5 seconds, 10 seconds, 30 seconds, etc.). However, any other event trigger may additionally or alternatively be used. For example, the events may be triggered based on user interaction with the media device, detection of a video watermark, identification that media is being presented, etc. If no event is detected, the media presenter 210 continues to present the media (block 610).

If an event is detected (block 620), the example video retriever 230 captures an image of the presented media (block 630). In the illustrated example, the video retriever 230 captures the image by retrieving a screenshot of the display 159 and/or output of the media presenter 210. However, in some examples, the example video retriever 230 captures an image via the image sensor 225. The example metadata extractor 240 uses image processing techniques on the captured image to extract video metadata from the captured image (block 640). In the illustrated example, the example metadata extractor 240 extracts a chroma key from the captured image. However, any other image processing techniques may additionally or alternatively be used. The example metadata converter 245 converts the extracted metadata into a text format (block 650). In the illustrated example, the extracted metadata is formatted as a raster image, and is converted into text data. In the illustrated example, the text data is formatted as an ID3 tag. However, any other format of text data may additionally or alternatively be used.

The example transmitter 250 transmits the converted video metadata to the central facility 170 (block 660). In the illustrated example, the transmitter 250 transmits a user identifier and/or a device identifier that identifies the user of the media device and/or the media device itself. Transmitting the user and/or device identifier enables the central facility 170 to accurately associate demographic information with the identified media. In the illustrated example, the transmitter inserts a timestamp when transmitting the metadata to the central facility 170. Timestamping enables the central facility 170 to accurately determine when the identified media was presented. The example media presenter 210 then continues to present media (block 610).

FIG. 7 is a flowchart representative of example machine-readable instructions which may be executed to implement the example media device of FIGS. 1 and/or 2, and/or the example media monitor 163 of FIGS. 1 and/or 3.

The example program 700 of the illustrated example of FIG. 7 begins at block 710 when the example video retriever 250 captures an image of presented media (block 710). In the illustrated example, the image is captured via an image sensor 225. For example, the image sensor may be part of a security camera that is positioned to have a line of sight of a display of a media presentation device such as a television that may be used to monitor what is being presented by the television. The example metadata extractor 240 inspects the captured image to determine if a video watermark is included within the captured image (block 720). If no video watermark is detected, the video retriever continues to capture image(s) (block 710).

If the video watermark is detected (block 720), the example metadata extractor 240 uses image processing techniques to extract video metadata from the captured image (block 730). In the illustrated example, the example metadata extractor 240 extracts a chroma key from the captured image. However, any other image processing techniques may additionally or alternatively be used. The example metadata converter 245 converts the extracted metadata into a text format (block 740). In the illustrated example, the extracted metadata is formatted as a raster image, and is converted into text data. In the illustrated example, the text data is formatted as an ID3 tag. However, any other format of text data may additionally or alternatively be used.

The example transmitter 250 transmits the converted video metadata to the central facility 170 (block 750). In the illustrated example, the transmitter 250 transmits a user identifier and/or a device identifier that identifies the user of the media device and/or the media device itself. Transmitting the user and/or device identifier enables the central facility 170 to accurately associate demographic information to the identified media. In the illustrated example, the transmitter inserts a timestamp when transmitting the metadata to the central facility 170. Timestamping enables the central facility 170 to accurately determine when the identified media was presented. The example video retriever 230 then continues to capture an image(s) (block 710).

FIG. 8 is a flowchart representative of example machine-readable instructions which may be executed to implement the example central facility 170 of FIGS. 1 and/or 4. The example program 800 of the illustrated example of FIG. 8 begins at block 810 when the Internet interface 171 receives video metadata and a user/device identifier from a media device and/or a media monitor (block 810). The example metadata processor 450 stores the received metadata and user/device identifier (block 815). In the illustrated example, the received metadata and user/device identifier stored in the metadata database 460. However, the metadata and user/device identifier may be stored in any other location.

The example metadata processor 350 determines if a report should be prepared (block 817). In the illustrated example, the report is prepared based on a request received from a third party (e.g., an advertiser, a media publisher, etc.). However, the report may be prepared upon satisfaction of any other condition such as, for example, a threshold time having elapsed (e.g., prepare a report once a month), a threshold volume of media monitoring information having been received (e.g., only prepare a report once one thousand media viewing occurrences have been received), etc.) If a report is not to be prepared (block 817), the Internet interface 171 continues to receive video metadata and a user/device identifier from the media device and/or the media monitor (block 810).

If a report is to be prepared (block 817), the example metadata processor 450 accesses user demographics based on the received user/device identifier(s) (block 820). In the illustrated example, the metadata processor 750 interfaces with the user identifier determiner 420 to identify demographic information in association with the received user/device identifier(s). In some examples, the received user/device identifier identifies a device (e.g., the media device 155, the media monitor 163, etc.) that monitored the media presentation. In some examples, the device may not be associated with a single user, but instead, may be associated with multiple users and/or a particular location. For example, the location may be a sports bar where a media monitoring system has been installed. In such an example, demographics of persons at the location of the device (e.g., a sports bar) may be imputed to identify a general demographic of persons to which the media was presented. For example, media may have been identified at a sports bar which is typically populated by males between the ages of twenty and thirty. As such, demographic information of males between the ages of twenty and thirty may be applied to the identified media. The example reporter 470 then creates a report based on the received metadata and the user demographics (block 830). The report may be used to, for example, determine a demographic reach of a particular advertisement, etc.

Figure 9:
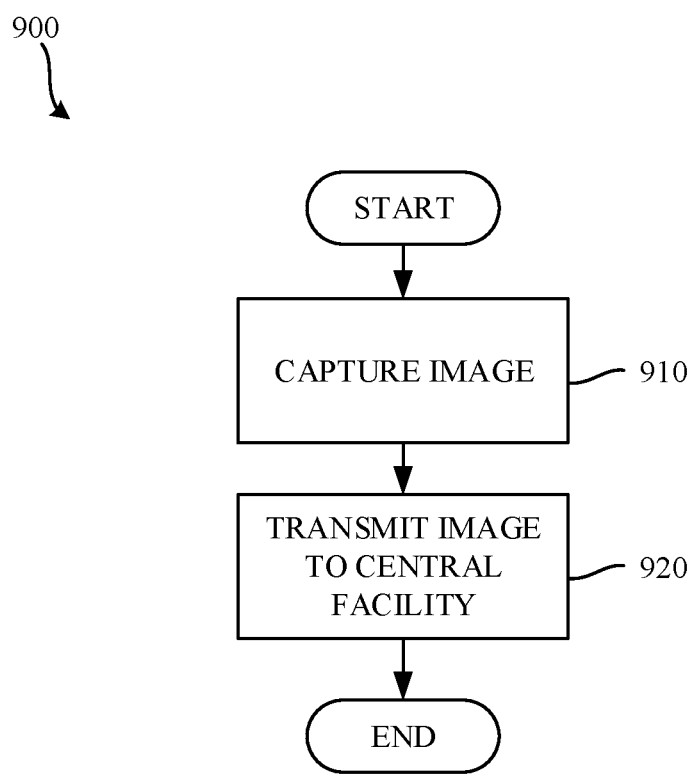
FIG. 9 is a flowchart representative of example machine-readable instructions that may be executed to implement the example media device of FIGS. 1 and/or 2 and/or the example meter of FIGS. 1 and/or 3, to transmit a captured image to the example central facility of FIG. 1.

FIG. 9 is a flowchart representative of example machine-readable instructions which may be executed to implement the example media device 155 of FIGS. 1 and/or 2, and/or the example media monitor 163 of FIGS. 1 and/or 3. In some examples, the example media device 155 and/or the example media monitor 163 does not include metadata extraction functionality. For example, the security system including a camera positioned to have a line of sight towards a television may not include metadata extraction functionality to process received images to identify a video watermark. Instead, the example media device 155 and/or the example media monitor 163 may transmit the captured image to the central facility for metadata extraction.

The example program 900 of the illustrated example of FIG. 9 begins at block 910 when the video retriever 230 captures an image of presented media (block 910). In the illustrated example, the video retriever 230 captures the image using the image sensor 225. However, the image may be captured in any other fashion. The example transmitter 250 transmits the captured image and the user/device identifier to the central facility 170 (block 920). Transmitting the user and/or device identifier enables the central facility 170 to accurately associate demographic information to the identified media. In the illustrated example, the transmitter 250 inserts a timestamp when transmitting the metadata to the central facility 170. Timestamping enables the central facility 170 to accurately determine when the identified media was presented. The example video retriever 230 then continues to capture an image(s) (block 910).

Figure 10:
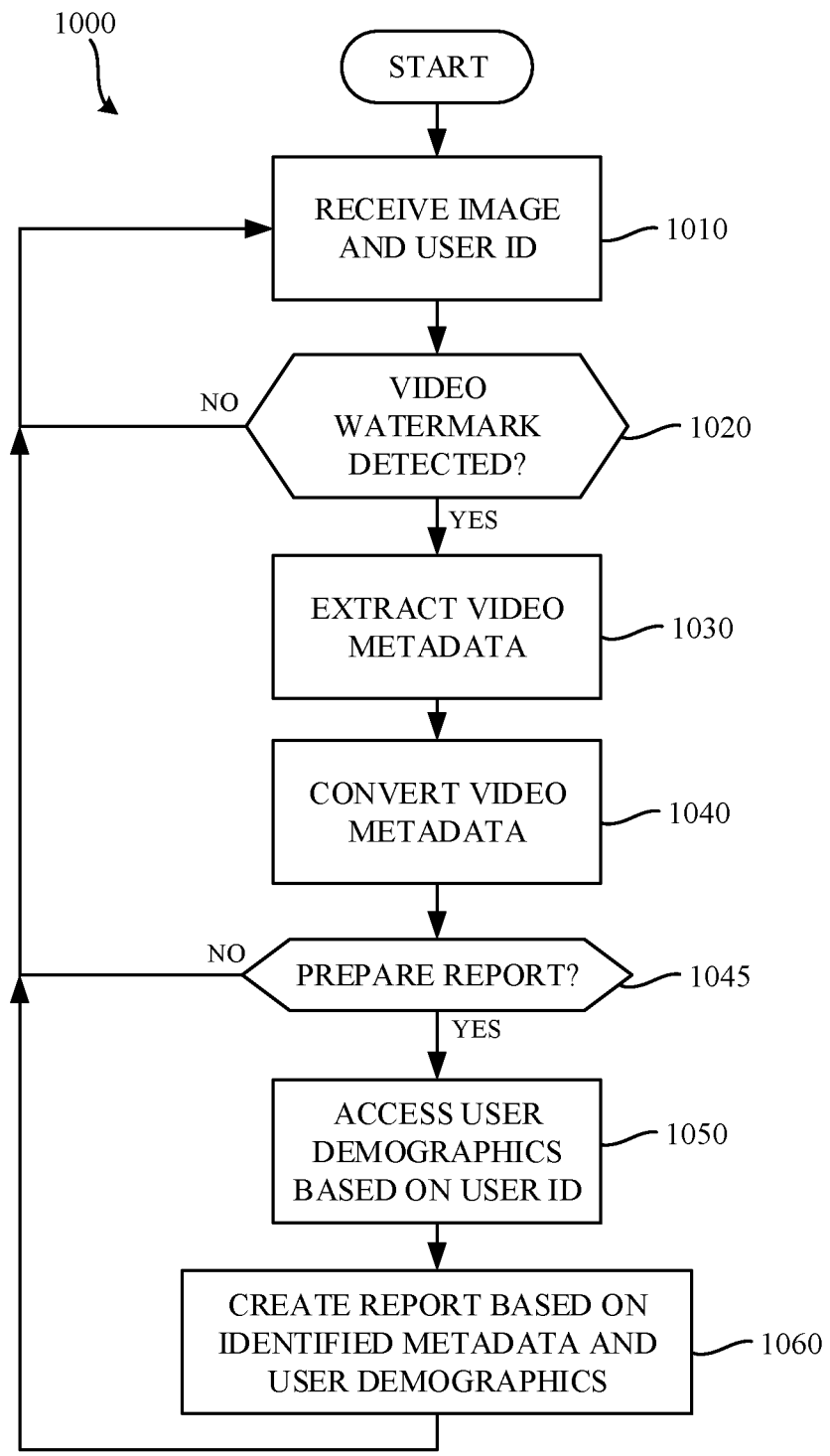
FIG. 10 is a flowchart representative of example machine-readable instructions that may be executed to implement the example central facility of FIGS. 1 and/or 4.

FIG. 10 is a flowchart representative of example machine-readable instructions which may be executed to implement the example central facility 170 of FIGS. 1 and/or 4. As disclosed in connection with FIG. 9, in some examples, the media device 155 and/or the media monitor 163 does not include metadata extraction functionality. Instead, metadata extraction functionality, in some examples, is implemented by the central facility 170. The example program 1000 of the illustrated example of FIG. 10 begins at block 1010 when the Internet interface 171 of the example central facility 170 receives an image and a user and/or device identifier from the media device and/or the media monitor (block 1010).

The example metadata extractor 440 inspects the captured image to determine if a video watermark is included within the captured image (block 1020). If no video watermark is detected, the Internet interface 171 continues to receive images (block 1010). If the video watermark is detected (block 1020), the example metadata extractor 430 uses image processing techniques to extract video metadata from the captured image (block 1030). In the illustrated example, the example metadata extractor 430 extracts a chroma key from the captured image. However, any other image processing technique(s) may additionally or alternatively be used. The example metadata converter 440 converts the extracted metadata into a text format (block 1040). In the illustrated example, the text data is formatted as an ID3 tag. However, any other format of image and/or text data may additionally or alternatively be used.

The example metadata processor 450 determines if a report should be prepared (block 1045). In the illustrated example, the report is prepared based on a request received from a third party (e.g., an advertiser, a media publisher, etc.). However, the report may be prepared upon satisfaction of any other condition such as, for example, a threshold time having elapsed (e.g., prepare a report once a month), a threshold volume of media monitoring information having been received (e.g., only prepare a report once one thousand media viewing occurrences have been received), etc.) If a report is not to be prepared (block 1045), the Internet interface 171 continues to receive image(s) and user/device identifier(s) from the media device and/or the media monitor (block 1010).

If a report is to be prepared (block 1045), the example metadata processor 450 accesses user demographics based on the received user/device identifier(s) (block 1050). In the illustrated example, the metadata processor 450 interfaces with the user identifier determiner 420, to identify demographic information in association with the received user identifier. The example reporter 470 then creates a report based on the received metadata and the user demographics (block 1060). The report may be used to, for example, determine a demographic reach of a particular advertisement, etc.

Figure 11:
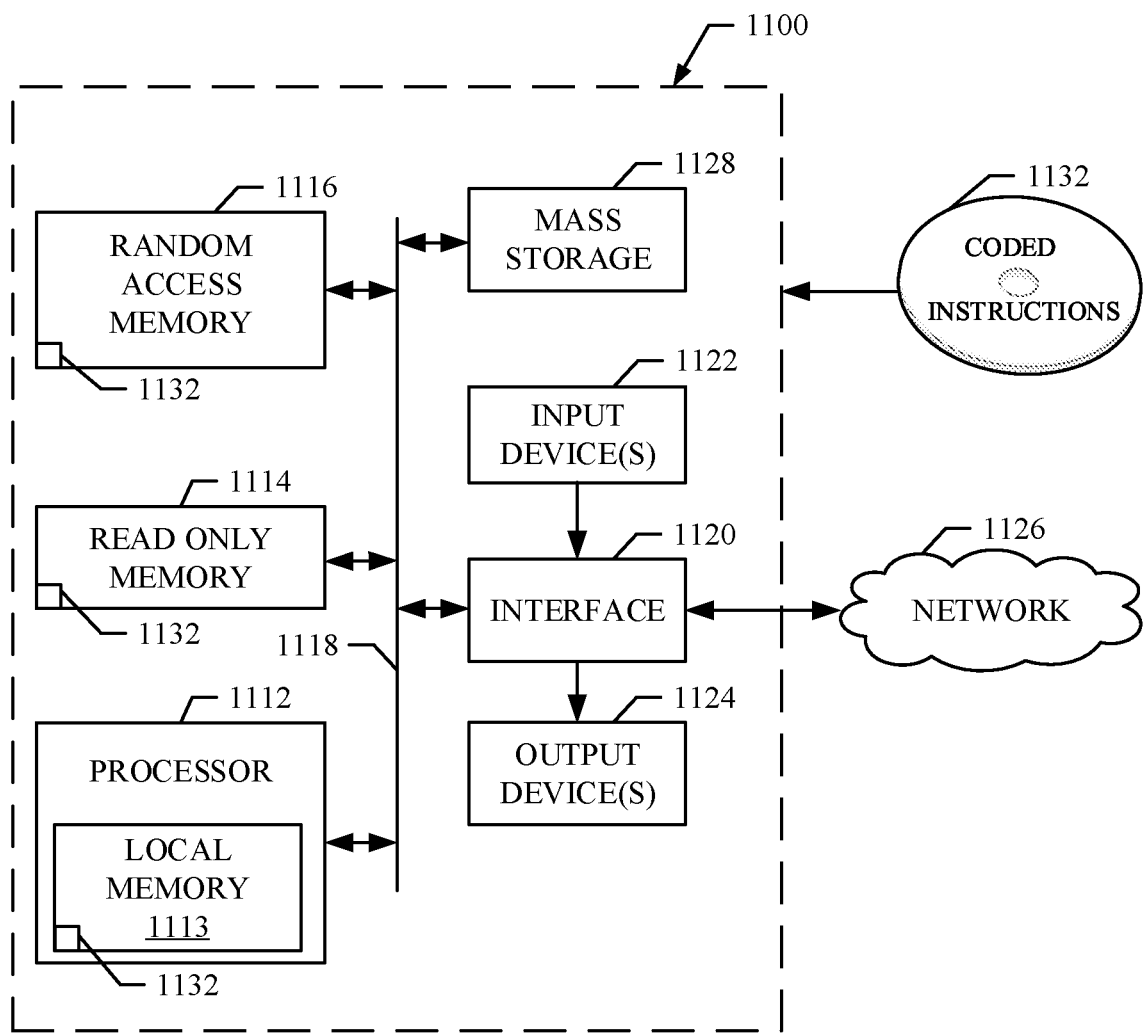
FIG. 11 is a block diagram of an example processor platform capable of executing the example machine-readable instructions of FIGS. 5, 6, 7, 8, 9, and/or 10 to implement the example service provider of FIGS. 1 and/or 2, the example media device of FIGS. 1 and/or 2, the example media monitor of FIGS. 1 and/or 3, and/or the example central facility of FIGS. 1 and/or 4.

FIG. 11 is a block diagram of an example processor platform 1100 capable of executing the instructions of FIGS. 5, 6, 7, 8, 9, and/or 10 to implement the example service provider 120, the example media device 155, the example media monitor 163, and/or the example central facility 170 of FIG. 1. The processor platform 1100 can be, for example, a server, a personal computer, a mobile device (e.g., a cell phone, a smart phone, a tablet such as an iPad™), a personal digital assistant (PDA), an Internet appliance, a security system, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 5, 6, 7, 8, 9, and/or 10 may be stored in the mass storage device 1128, in the volatile memory 1114, in the non-volatile memory 1116, and/or on a removable tangible computer readable storage medium such as a CD or DVD.

From the foregoing, it will be appreciated that the example methods, apparatus, and articles of manufacture disclosed herein enable identification of media in acoustically noisy environments and/or in environments where audio-based identification of media is not possible and/or feasible.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to measure media exposure, the apparatus comprising:
 a processor; and
 a non-transitory computer readable storage medium, having stored thereon program instructions that, upon execution by the processor, cause performance of a set of operations comprising:
  obtain an image of streaming media presented by a media device, the media device separate from the processor;
  extract a video watermark from a chroma key of the obtained image;
  convert the video watermark into text formatted metadata; and
  transmit the text formatted metadate to a central facility.

2. The apparatus of claim 1, wherein the media device is a television and the image is retrieved from a camera having a line of sight of a display of the media device.

3. The apparatus of claim 1, wherein the set of operations further comprising:
 trigger an extraction of the video watermark from the obtained image.

4. The apparatus of claim 3, wherein the extraction is triggered based on a timer reaching a threshold time limit.

5. The apparatus of claim 1, wherein the set of operations further comprising:
 obtain the image of the presented media via an image sensor.

6. An apparatus to measure media exposure, the apparatus comprising:
 means for obtaining an image of streaming media presented by a media device, the media device separate from the means for obtaining;
 means for extracting a video watermark from a chroma key of the obtained image;
 means for converting the video watermark into text formatted metadata; and
 means for transmitting the text formatted metadata to a central facility.

7. The apparatus of claim 6, wherein the media device is a television and the image is obtained from a camera having a line of sight of a display of the media device.

8. The apparatus of claim 6, further including means for triggering an extraction of the video watermark from the obtained image.

9. The apparatus of claim 8, wherein the extraction is triggered based on a timer reaching a threshold time limit.

10. The apparatus of claim 6, wherein the means for obtaining the image is to obtain the image of the presented media via a means for sensing.

11. An apparatus to measure media exposure, the apparatus comprising:
 means for obtaining an image of streaming media presented by a media presenter separate from the means for obtaining;
 means for extracting video metadata from a chroma key of the obtained image;
 means for converting the video metadata into a text format; and
 means for transmitting the text formatted metadata to a central facility.

12. The apparatus as described in claim 11, wherein the media presenter is a display and the means for obtaining is to obtain a screenshot of the display.

13. The apparatus as described in claim 11, further including means for triggering the means for extracting to extract the video metadata from the obtained image.

14. The apparatus as described in claim 11, further including means for sensing, and wherein the means for obtaining is to obtain the image of the presented via the means for sensing.

15. An apparatus to monitor media presented by a media device, the apparatus comprising:
 means for obtaining, with the means for obtaining separate from the media device presenting media to a user, media of the media device, the media including metadata embedded into a video stream of the media using a chroma key;

means for extracting a watermark from the media displayed at the media device, the watermark including the chroma key;

means for converting the watermark to an ID3 metadata format; and means for transmitting the ID3 formatted metadata to a central facility.

16. The apparatus as described in claim 15, wherein the means for transmitting is to transmit at least one of a user identifier or a device identifier to the central facility in association with the ID3 formatted metadata.

17. The apparatus as defined in claim 15, wherein the media includes pulse code modulation (PCM) audio data.

18. The apparatus as defined in claim 15, wherein the media device is television.

19. The apparatus as defined in claim 15, wherein the media device is coupled to a television to present the media on the television.

20. The apparatus as defined in claim 15, wherein the means for transmitting is to transmit the ID3 formatted metadata to the central facility via the Internet.

* * * * *